United States Patent [19]

Lucas et al.

[11] 3,862,569

[45] Jan. 28, 1975

[54] MEASUREMENT OF THE CHANGE IN LONGITUDINAL FORCE IN A RAIL

[76] Inventors: John C. Lucas; George W. Morland, both of c/o British Railways Board, 222 Marylebone Rd., London, England

[22] Filed: Apr. 16, 1973

[21] Appl. No.: 351,388

[52] U.S. Cl. ............................ 73/88.5 R, 73/DIG. 1
[51] Int. Cl. ............................................... G01b 7/16
[58] Field of Search .......... 73/88.5 R, 88 R, DIG. 1, 73/517 AV, 70, 70.2

[56] References Cited
UNITED STATES PATENTS

| | | | |
|---|---|---|---|
| 2,148,013 | 2/1939 | Carlson | 73/88.5 R |
| 3,052,116 | 9/1962 | Critchley et al. | 73/88.5 R |
| 3,132,319 | 5/1964 | Brooks | 73/88.5 R X |
| 3,192,418 | 6/1965 | Sansom | 73/67.8 X |
| 3,410,132 | 11/1968 | Hall | 73/88.5 R |
| 3,470,400 | 9/1969 | Weisbord | 73/DIG. 1 UX |

FOREIGN PATENTS OR APPLICATIONS

| | | | |
|---|---|---|---|
| 142,462 | 9/1960 | U.S.S.R. | 73/DIG. 1 |
| 189,185 | 12/1966 | U.S.S.R. | 73/DIG. 1 |

*Primary Examiner*—Richard C. Queisser
*Assistant Examiner*—Stephen A. Kreitman
*Attorney, Agent, or Firm*—Elliott I. Pollock

[57] ABSTRACT

A device for measuring the longitudinal force in a rail comprises a gauge set in a hole in the rail and whose output varies upon change in shape of the hole and hence upon change in longitudinal force in the rail. The device preferably comprises at least one wire extending across the hole and secured at its ends to the rail so that the change in vibration frequency of the wire when plucked is indicative of the change in shape of the hole.

3 Claims, 4 Drawing Figures

PATENTED JAN 28 1975

3,862,569

Transducer Body

Plucking magnet Coil for 1 Element.

13 Resistance Bridge for Temperature Measurement.

12 Circuit for Vibration Counting & Pulse Generation

MEASUREMENT OF THE CHANGE IN LONGITUDINAL FORCE IN A RAIL

BACKGROUND OF THE INVENTION

This invention relates to a device for enabling the in-situ measurement of the longitudinal force in rails of railway track and in other elongated structural members which are subjected to longitudinal loading (all herein referred to as "rails").

The onset of lateral buckling of continuously welded rail is determined, for given ballast, sleeper and fastening conditions, by the amplitude and wavelength of any lateral misalignment and most importantly by the longitudinal compressive force in the rail. The inter-relation between the force and malalignment has been the subject of many investigations.

While malalignments can be relatively easily observed and measured, no means has existed until recently of measuring the longitudinal force in the rail other than by cutting it and recording the resulting change in length or strain. The device of the present invention has been developed to overcome this situation by providing a means whereby the force can be measured or monitored at will and non-destructively.

SUMMARY OF THE INVENTION

According to this invention, a device for measuring the longitudinal force in a rail comprises a gauge disposed in a pre-formed hole in the rail and arranged to detect changes in shape of the hole caused by changes in longitudinal force in the rail.

The principle on which the invention is based is that if a hole of, for example, 1 inch diameter is bored in a rail, the shape of the hole will change if the longitudinal force in the rail changes. For an increase in tensile longitudinal force the longitudinal axis of the hole will get longer and the transverse axis become shorter, the changes being related to the change in force in the rail. If the changes in length of one or preferably both axes can be accurately measured it is possible to measure the longitudinal force in the rail.

In one device in accordance with the invention two wires extend diametrically across the hole at right angles to each other and are fastened at their ends to the rail. Conveniently the wires may be fastened to the rail via a ring which is shrunk, screwed, glued or otherwise bonded in the hole in the rail. Changes of diameter of the hole will cause a change in the frequency of vibration of the wires when they are plucked. The force in the rail can be deduced from the frequencies of vibration of the two wires. The wires may be fine wires so that the frequency of vibration is simply related to the tensile stress, the wires being given a pre-set tension in the unloaded state of the rail. Alternatively the wires may be sufficiently short in relation to their cross-section that they can sustain a compressive load in the manner of a beam. The wires need not in this case be given a specific pre-set tension.

In use in rails of railway track the two wires would be installed in lengths of continuous welded rail when destressing or at other times and suitable instrumentation would be provided whereby the wires could be set in vibration and their frequencies of vibration measured. The wires may be set into vibration by magnetic or piezo-electric means. If each of the wires is set into vibration by an electro-magnetic coil, this coil may also be used for detecting the vibration frequency and for simultaneously and independently measuring the temperature of the rail by accurately measuring changes in electrical resistance of the coil wire.

BRIEF DESCRIPTION OF THE DRAWINGS

In order that the invention may be readily understood one construction of gauge device in accordance with the invention and its method of operation in connection with a rail of a railway track will now be described by way of example with reference to the accompanying diagrammatic drawings in which.

DESCRIPTION OF THE PREFERRED EMBODIMENTS

Figure 1:
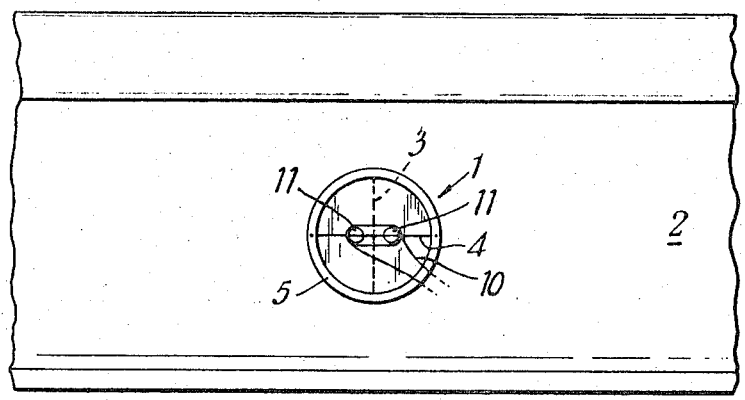
FIG. 1 shows the manner of mounting the gauge device in the rail.
Figure 2:
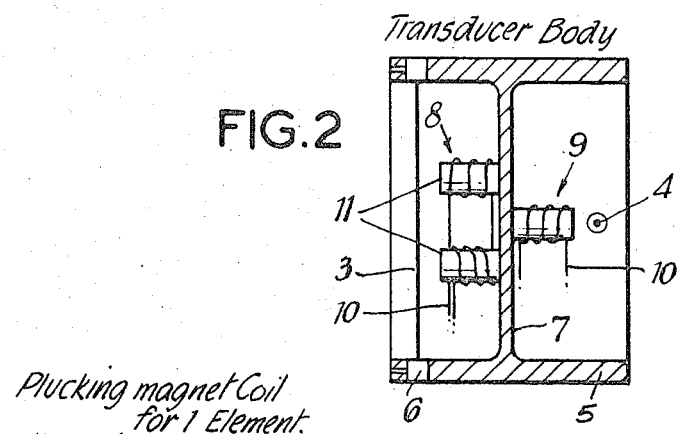
FIG. 2 shows to a larger scale than FIG. 1, a sectional view of the gauge.

To accommodate gauge 1 a hole is drilled in the vertical web of the rail 2 on the neutral axis of the rail 2. The gauge 1 comprises two high tensile steel wires 3 and 4 which extend at right angles to each other and are secured at their ends in a ring 5. The ring 5, which conforms to the periphery of the hole in the rail, is fixed in the hole with the wire 3 extending vertically and the wire 4 extending horizontally. At one of their ends the wires 3 and 4 are secured to the ring 5 via a tensioning device 6 which enables tensioning of the wires 3 and 4 after the ring 5 has been inserted in the rail. The ring 5 is a thin-walled hollow steel cylinder with a partition wall 7 across its middle, the whole being machined from a single solid piece of steel.

Mounted on the partition wall 7 are electromagnetic coil assemblies 8 and 9. The assembly 8 serves both as plucking and vibration detecting means for the wire 3 and the assembly 9 similarly serves as plucking and vibration detecting means for the wire 4. Each assembly 8, 9 comprises a coil 10 mounted on poles 11. The coils 10 have electrical connections which enable their ready connection (e.g. by coaxial plugs and sockets) to a vibration and pulse generation circuit 12. Thus the relatively expensive circuit 12 can be made portable so that it can be transported from the site of one gauge to another.

The wires 3 and 4 are plucked by energizing the coil assemblies 8 and 9 from the pulse generation part of the vibration counting and pulse generation circuit 12. The poles 11 on which the coils 10 are mounted are positioned close to the wires and a voltage pulse of sufficient amplitude and duration is applied to set the wires into oscillation with a naturally damped exponentially decaying sine-wave. The wires 3 and 4, when plucked, move freely in the magnetic field of the coil assemblies 8 and 9 and each induces in its associated coil assembly an alternating voltage whose frequency corresponds to the frequency of vibration of the wire. This induced voltage provides the input to the vibration counting part of the circuit 12.

When plucked, each of the wires 3 and 4 is free to vibrate in a half-wave mode at a frequency determined by the tension in the wire, by its length and by its mass. Length and mass remain substantially constant for any given wire so that the variation in tension and hence vibration frequency is predominantly dependent upon variation in strain of the wire.

The circuit 12 for vibration counting and pulse generation has not been shown in detail in the drawings. Its basic construction will be readily appreciated from the previously described operation of its energizing pulsed supply for plucking the wires 3 and 4 and from the ensuing brief description of how it utilizes the voltages induced in the coil assemblies 8 and 9 resulting from vibration of the wires 3 and 4.

The vibration counting part of the circuit digitally counts the period of wire vibration for a fixed number of cycles and hence provides a measure of the frequency of wire vibration. That is to say a digital count is provided of the time period taken for the voltage induced in each of the coils 10 to pass through a fixed number of cycles, say 100 (this time period being designated $t_{100}$ in FIG. 4, to be discussed hereinafter). If the rail 2, the ring 5 and the wires 3 and 4 all have the same coefficient of thermal expansion, thermal effects will not cause spurious readings since no tension will be introduced in the wire by a temperature change. Facilities are provided in the circuit 12 to delay the start of counting to ensure that the wires 3 and 4 have settled into a naturally damped mode of oscillation.

The frequencies of vibration of the two wires 3 and 4 are not inter-related in the circuit 12. The two counts are recorded independently and used in subsequent calculations to determine the effects to be measured.

The load in the rail could be measured by one of the wires 3 and 4, preferably the horizontal one 4 since it has been shown in tests that the vertical one 3 is much less sensitive; the wire 3 is therefore incorporated in the gauge mainly for checking purposes and also as a possible means for discriminating between different effects mentioned hereinafter.

The gauges are themselves very small and portable, and easy to install. They can be fixed in new and used rail, or installed in a new length of unused rail which can be welded into a used rail. It is convenient for the gauges to be placed in a rail which is in an unstressed or "free" state to obtain a datum zero load reading. This, however, is not essential, provided that at some time subsequent to installation, the reading in the stress-free state may be obtained.

The preparatory work required for fitting a gauge is the drilling and remaining of a hole on the neutral axis. A gauge is then glued (or in exceptional circumstances shrunk) into the hole. For each gauge a calibration is made on site. Calibration curves will be obtained for each gauge substantially of the form showing in FIG. 4, where calibration is plotted against period $t_{100}$ (in secs) for a hundred cycles of vibration (i.e. of induced voltage).

From the calibration curves the load in the rail can be related directly to the vibration frequencies of the wires. Thus for example if $t_{100}$ for the wire 4 has a certain value, then the corresponding value of load in the rail in tons load can be read off the curve for the wire 4, this load either being a compressive or a tensile load. The value for $t_{100}$ for the wire 3 should give the same value for load in the rail; if it does not the difference between the values can be used to discriminate between different effects, as mentioned hereinafter.

Figure 3:
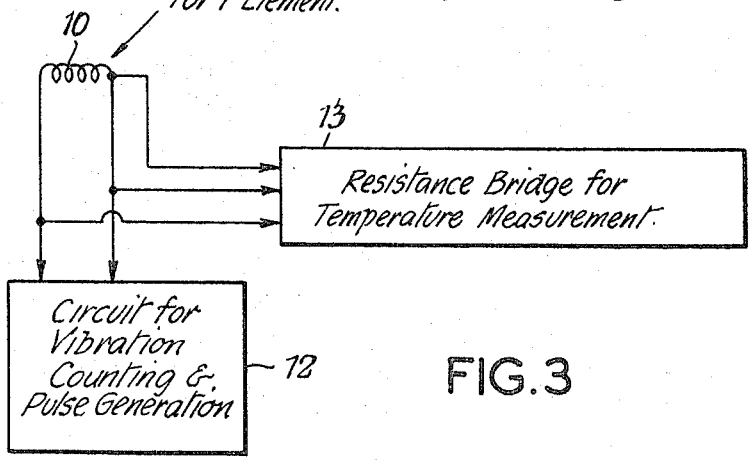
FIG. 3 shows a simple circuit for one vibrating wire of the gauge device.

Once installed, each of the gauges may be read at any time using the portable circuit 12. If the gauges are to be used to monitor changes in force, an estimate must also be made of the bulk rail temperature at the time of reading of the gauges. Temperature measurement may be made using the plucking coils 10 in accordance with the resistance thermometer principle. Thus a resistance bridge 13 (FIG. 3) for temperature measurement is incorporated with the circuit 12 into a single portable unit. When the resistance bridge 13 is connected to coil 10 its change of resistance with temperature is accurately measured.

Figure 4:
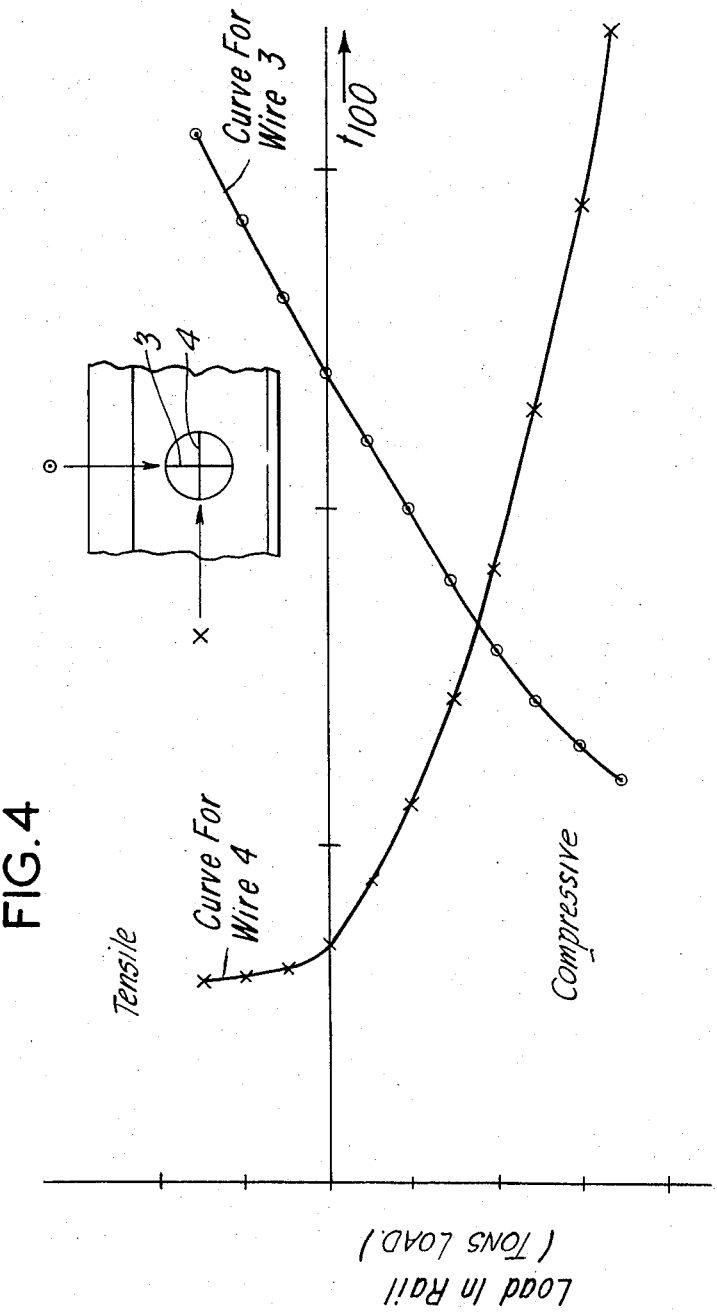
FIG. 4 shows a typical calibration graph for use with the device.

From the digital counts obtained from circuit 12, the rail force may be deduced using the calibration curves of FIG. 4. Using the temperature readings, this may be referred back to the destressing temperature and the variation from stress-free load in the rail can then be calculated.

Decrease in force in the rail can occur due, inter alia, to creep, mining subsidence and "rolling out" of rails. The gauge enables these effects to be assessed at any required intervals in time. The effect of rolling out is the restraint of growth due to cold work of the rail head by passing trains. As rolling out largely affects the rail head, while thermal expansion is shown as a growth of the whole cross section, it is possible that the gauges will respond in different fashions to the two different effects. The provision of the vertical sensing wire 3 in combination with the horizontal sensing wire 4 enables the separation of these effects.

We claim:

1. The combination of a rail having a hole therein and a gauge set in said hole in the rail for measuring changes in longitudinal force in the rail, said gauge comprising a ring which is a close fit in the hole in the rail and which is secured to the rail around the periphery of said hole, a first wire extending across the hole in the longitudinal direction of the rail and secured at its opposing ends to said ring, a second wire extending across the hole at right angles to said first wire and secured at its opposing ends to said ring in spaced relation to said first wire, the rail, ring, and each of said first and second wires all having substantially the same coefficient of thermal expansion, means for setting said first and second wires into vibration, means for detecting the vibration frequencies of said first and second wires, the means for setting said first and second wires into vibration comprising a respective electromagnetic coil for each wire, the means for detecting the vibration frequencies of each of said first and second wires also comprising its respective electromagnetic coil, said gauge including supporting means extending across said ring in a plane transverse to the axis of said ring, and pole pieces for said electromagnetic coils secured to said supporting means.

2. The combination of claim 1 wherein said supporting means includes a partition wall extending across said ring in a plane transverse to the axis of said ring, said first wire being secured to said ring on one side of said partition wall and spaced therefrom, said second wire being secured to said ring on the other side of said partition wall and spaced therefrom, said pole pieces being secured to the opposing sides of said partition wall and extending therefrom toward said first and second wires respectively, said electromagnetic coils being mounted on said pole pieces respectively.

3. The combination of claim 2 wherein said ring and partition wall are integral with one another, said partition wall extending across said ring at a location midway between the opposing ends of said ring.

* * * * *